J. Richmond,
Dressing Millstones.
No. 35,894.      Patented July 15, 1862.
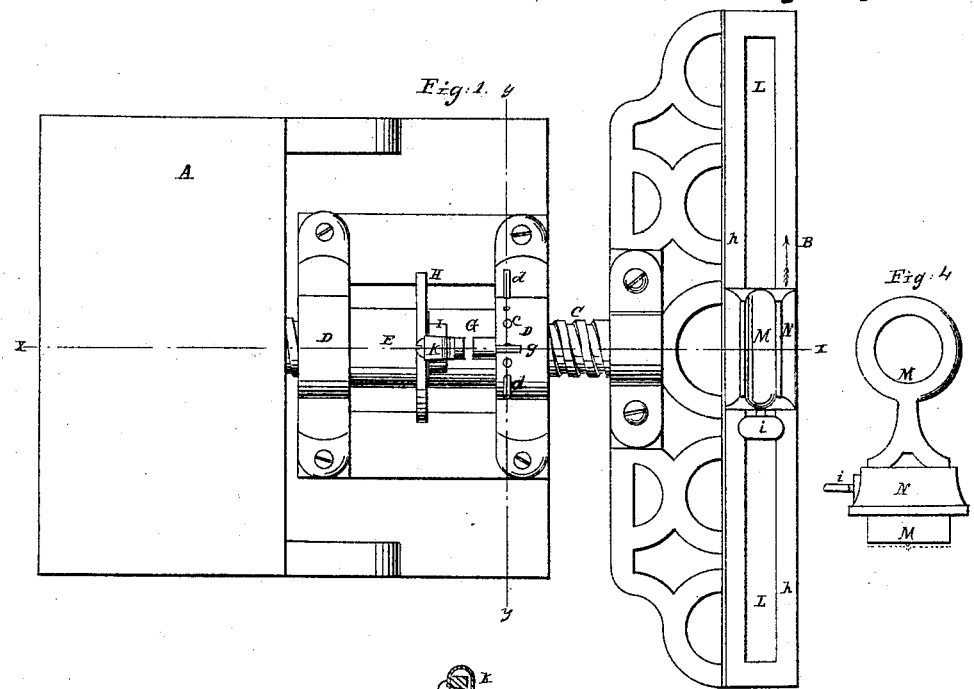
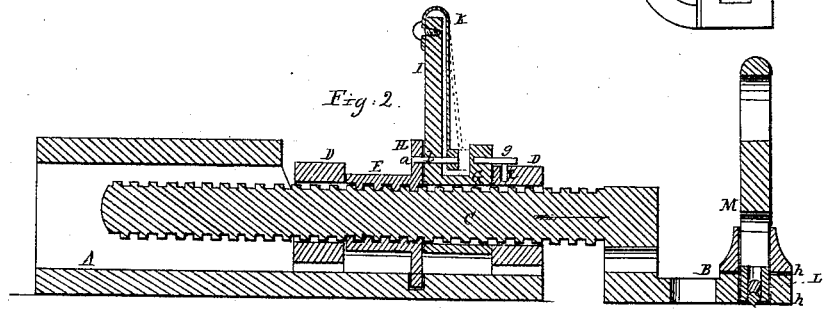
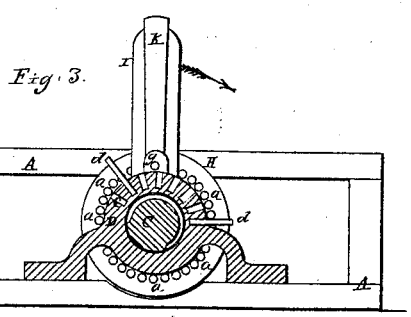
Witnesses:
R. F. Osgood
D. C. Johnson
Inventor:
Jas Richmond
by J. Fraser & Co. Attys

UNITED STATES PATENT OFFICE.

JAMES RICHMOND, OF LOCKPORT, NEW YORK.

IMPROVEMENT IN MACHINES FOR DRESSING MILLSTONES.

Specification forming part of Letters Patent No. 35,894, dated July 15, 1862.

*To all whom it may concern:*

Be it known that I, JAMES RICHMOND, of Lockport, in the county of Niagara and State of New York, have invented certain new and useful Improvements in Machines for Dressing Millstones; and I do hereby declare that the following is a full and exact description thereof, reference being had to the accompanying drawings, making part of this specification—

Figure 1 being a plan of my improved machine; Fig. 2, a central longitudinal vertical section thereof in the plane indicated by the line $x\ x$, Fig. 1; Fig. 3, a transverse vertical section of the same in the plane indicated by the line $y\ y$, Fig. 1; Fig. 4, an elevation of the cutter stock or holder.

Like letters designate corresponding parts in all the figures.

My improved machine is intended for use with a diamond point for planing off or cutting down the inequalities of millstones; and the invention consists in the employment of a guide-bed in connection with the adjustable stock or holder of the diamond in such a manner that the latter always cuts truly on the stone; and, also, in combination, with the said guide-bed, of the use of a platform with a suitable arrangement for giving a variable feed to the bed, at the same time allowing the latter to adapt itself perfectly to the surface which is being dressed.

The machine is composed of two principal parts—the platform or frame A, on which the immediate actuating parts are mounted, and the guide-bed B, connected with it by means of its permanent screw C, or equivalent. The platform may be made of any desirable or convenient form and size for sustaining the parts as represented. On this platform, at a suitable distance apart, are situated vertical bearings D D, through which the screw C plays without engaging. This screw is of sufficient length for the purpose designed—viz., to produce a suitable feed movement in dressing millstones—and it is of a size to insure proper strength. On the screw, between the bearings D D, are situated a feeding-nut, E, and collar G, occupying the whole space, and arranged and operating as follows: The nut E is cut with a female thread, and engages with the thread of the screw, as represented most clearly in Fig. 1, and it has on its face next the collar an enlarged head or disk, H, in which are made a set of concentric holes or ratchets $a\ a\ a$, situated closely together, as represented. The collar G turns loosely on the screw without engaging, and has on its face next the disk of the nut an upright lever, I, of sufficient size to be operated by hand. To this lever is fastened at its upper end a flat spring, K, passing downward and having secured at its lower end a right-angled pin or pawl, $b$, extending inward through a hole in the lever and corresponding in position with the holes or ratchets $a\ a$, with which it engages, thereby turning the nut with the collar and operating the screw. This arrangement is shown most clearly in the section Fig. 2, where the parts are represented as thus engaged and in the act of turning.

In the bearing D, next the collar, is made a transverse set of radial holes, $c\ c\ c$, at proper distances apart, in which, at suitable positions, fit pins $d\ d$. To a projection, $f$, of the collar is secured a horizontal pin, $g$, projecting out over the bearing, so as to strike against the pins $d\ d$ in the movements of the lever. Thus by arranging the pins $d\ d$ in their holes nearer together or farther apart, the length of stroke of the lever is gaged, and consequently the feeding motion of the screw C adjusted as desired.

Instead of the above-described feeding device, any equivalent arrangement that will produce the same effect may be employed. For instance, a rack-bar may be used instead of the screw C, and a pinion gearing with it instead of the feeding-nut E, and these may be operated in substantially the same way by means of the lever I, or its equivalent, arranged and operated in a manner not essentially differing from that above mentioned; but I prefer the method described, as it is simple and accomplishes the purpose effectively.

The head of the screw is secured to the guide-bed B in any convenient manner, and the latter moves with it. The guide-bed is usually made of cast-iron, and is of suitable length to correspond with the desired length of the stroke of the cutter. The upper and lower surfaces, $h\ h$, thereof are made perfectly true and plane, the former for the purpose of allowing the diamond stock or holder to slide thereon evenly and truly, and the latter to rest evenly and truly on the surface of the millstone. A slot or guide passage, L, of suitable size for the purpose designed is made in the guide-bed, extending nearly its whole length, as represented most clearly in Fig. 1, in which rests and slides the shank of the cutter, as will presently be described.

The cutter is composed of a shank, M, of sufficient size to be seized and operated by the hand, having secured in its lower end resting in the slot the diamond by which the dressing is performed, and a supporting-slide, N, resting and moving on the upper plane surface, $h$, of the guide-bed, and through which the shank passes and is adjusted by means of a set-screw, $i$, Figs. 1 and 4. Thus arranged the cutter is actuated forth and back by the right hand of the operator, similarly to a plane for planing wood, while the feeding is accomplished by his left hand operating the lever I. The under surface of the guide-bed by being perfectly level touches only on the hard, flinty, glazed portions of the stone that do not wear down with the softer portions, and which it is desirable to cut. The upper surface, $h$, being perfectly plane and parallel with the under surface, insures the cutting of these inequalities in the surface of the stone, so as to present an exactly level surface, which cannot be accomplished by any ordinary means. By the vertical adjustment of the shank M in the slide N the diamond is made to cut to any depth required.

The connection of the guide-bed with the feeding arrangement above described by means of the screw C insures a regular feed, which may be varied to any extent desired. This arrangement is very simple and effective. The screw also thus forms a swivel-joint with the platform A and its parts, so that the guide-bed always retains its proper position on the surface of the stone independent of the position of the platform. This is important, as it is frequently the case that pieces of stone or other substances get under the edge of the platform, thus inclining it to one side or to an angle with the surface of the stone. The raised portion of the platform is intended as a seat for the operator, whose weight always keeps the machine in place.

What I claim as my invention, and desire to secure by Letters Patent, is—

1. The guide-bed B, with plane parallel surfaces $h\,h$, and provided with a slot, L, in combination with the adjustable diamond-shank M and its slide N, arranged and operating substantially as and for the purpose herein described.

2. The guide-bed B, connected with the stationary platform A by means of the screw C, or its equivalent, operated by means of the nut E and lever I, provided with a pawl, $b$, or their equivalents, and gaged by means of the adjustable pins $d\,d$, arranged and operating substantially as and for the purposes herein set forth.

In witness whereof I have hereunto signed my name in the presence of two subscribing witnesses.

JAMES RICHMOND.

Witnesses:
  R. F. OSGOOD,
  J. FRASER.